US007797130B1

(12) United States Patent (10) Patent No.: US 7,797,130 B1
Silberg et al. (45) Date of Patent: Sep. 14, 2010

(54) BASELINE COMPARATIVE LEADING INDICATOR ANALYSIS

(75) Inventors: Eric J. Silberg, Potomac, MD (US); Phong Hua Nguyen, Reston, VA (US); Daniel P. Everson, Silver Spring, MD (US); Naipei P. Bi, Gaithersburg, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 260 days.

(21) Appl. No.: 12/006,754

(22) Filed: Dec. 20, 2007

(51) Int. Cl.
*G06F 17/18* (2006.01)
(52) U.S. Cl. .................. 702/179; 702/60; 702/181; 702/183; 702/84; 702/35; 700/108; 700/109; 700/110; 700/111; 700/35; 700/121; 714/37; 714/48
(58) Field of Classification Search .......... 702/60, 702/181, 179, 183, 84, 35; 700/108, 121, 700/109, 110, 111; 714/37, 48
See application file for complete search history.

(56) References Cited

U.S. PATENT DOCUMENTS

| 5,175,710 | A | 12/1992 | Hutson | |
| 5,347,452 | A | 9/1994 | Bay, Jr. | |
| 5,819,202 | A * | 10/1998 | Sato et al. | 702/33 |
| 6,453,009 | B2 * | 9/2002 | Berezowitz et al. | 378/118 |
| 6,473,084 | B1 | 10/2002 | Phillips et al. | |
| 6,606,615 | B1 | 8/2003 | Jennings et al. | |
| 6,629,060 | B2 * | 9/2003 | Okuno et al. | 702/187 |
| 6,750,864 | B1 | 6/2004 | Anwar | |
| 6,772,096 | B2 * | 8/2004 | Murakami et al. | 702/184 |
| 6,792,399 | B1 | 9/2004 | Phillips et al. | |
| 6,834,256 | B2 * | 12/2004 | House et al. | 702/181 |
| 6,842,719 | B1 | 1/2005 | Fitzpatrick et al. | |
| 7,000,193 | B1 | 2/2006 | Impink, Jr. et al. | |
| 7,065,534 | B2 | 6/2006 | Folting et al. | |
| 7,072,863 | B1 | 7/2006 | Phillips et al. | |

(Continued)

OTHER PUBLICATIONS

U.S. Appl. No. 12/006,753, filing Dec. 20, 2007, entitled "Intelligent Leading Indoor Display," joint inventors Eric J. Silberg, Phong Hua Nguyen, Daniel P. Everson, and Naipei P. Bi.

(Continued)

*Primary Examiner*—Carol S Tsai
(74) *Attorney, Agent, or Firm*—Howard Kaiser

(57) ABSTRACT

According to typical inventive practice, a baseline describing a statistical distribution is established for a set of historical occurrences of an event. Comparison is made between the baseline and at least one current occurrence of the same event. Any current occurrence that is anomalous vis-à-vis the baseline is considered a possible leading indicator. According to some inventive embodiments of graphical presentation of such comparison, at least one graphical baseline comparative display component is rendered that includes a "bar" (describing a historical statistical distribution with respect to a criterion pertaining to occurrence of an event) and a "slider" (describing one or more current occurrences of the event). The bar includes at least one band representing a statistical mean range, and at least one band representing a statistical outlier range. Situation of the slider along the bar indicates whether and to what extent the current occurrence(s) is/are anomalous vis-à-vis the baseline.

17 Claims, 10 Drawing Sheets

U.S. PATENT DOCUMENTS

| | | | |
|---|---|---|---|
| 7,080,027 | B2 | 7/2006 | Luby et al. |
| 7,124,438 | B2 | 10/2006 | Judge et al. |
| 7,162,489 | B2 | 1/2007 | Folting et al. |
| 7,254,514 | B2* | 8/2007 | House et al. ................ 702/181 |
| 7,593,912 | B2* | 9/2009 | Cheng et al. ................ 706/62 |
| 7,624,080 | B1 | 11/2009 | Morales et al. |
| 2004/0260430 | A1* | 12/2004 | Mansingh et al. ........... 700/286 |
| 2004/0260489 | A1* | 12/2004 | Mansingh et al. ............ 702/60 |
| 2007/0220368 | A1* | 9/2007 | Jaw et al. ...................... 714/48 |
| 2007/0282767 | A1* | 12/2007 | Cheng et al. ................. 706/15 |
| 2007/0299362 | A1* | 12/2007 | Epley et al. ................. 600/559 |
| 2008/0147486 | A1* | 6/2008 | Wu ............................. 705/10 |
| 2008/0208532 | A1* | 8/2008 | Blemel ...................... 702/183 |
| 2009/0249129 | A1* | 10/2009 | Femia ......................... 714/47 |

OTHER PUBLICATIONS

U.S. Appl. No. 12/497,875, filing Jul. 6, 2009, entitled "Aircraft Approach to Landing Analysis Method," joint intventors Daniel P. Evanson, Prong Hua Nguyen, and Eric J. Silberg.

U.S. Appl. No. 11/789,128, filing Apr. 5, 2007, entitled "Battery Charging Arrangement for Unmanned Aerial Vehicle," joint inventors Eric J. Silberg and Judah H. Milgram (application allowed Feb. 23, 2010).

Eric J. Silberg, Phong Hua Nguyen, Daniel P. Everson, and David Wilson, "Leading Indicators—A Powerful Tool to Improve Rotorcraft Safety," presented at the International Helicopter Safety Symposium, Montreal, Canada, Sep. 19-21, 2007 (11 pages).

Eric J. Silberg and Daniel P. Everson, "Advanced Aircraft Landing Analysis and Assessment Methods for Naval Aircraft," presented at the American Institute of Aeronautics and Astronautics Modeling and Simulation Technologies Conference, Honolulu, Hawaii, Aug. 18-21, 2008 (15 pages).

Eric J. Silberg, "Determination and Utilization of Leading Indicators for Improved Aircraft Operations," technical pager submitted by student Eric J. Silberg to two University of Maryland faculty members on Dec. 22, 2006 to fulfill a masters program requirement in the Department of Aerospace Engineering of the University of Maryland, College Park (32 pages).

* cited by examiner

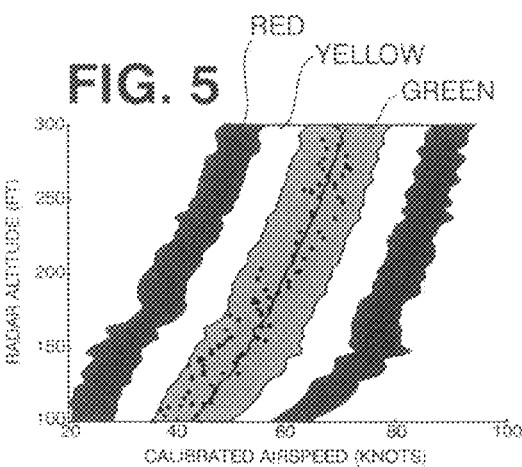
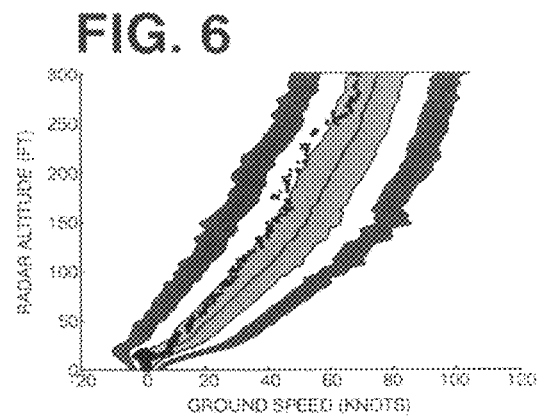
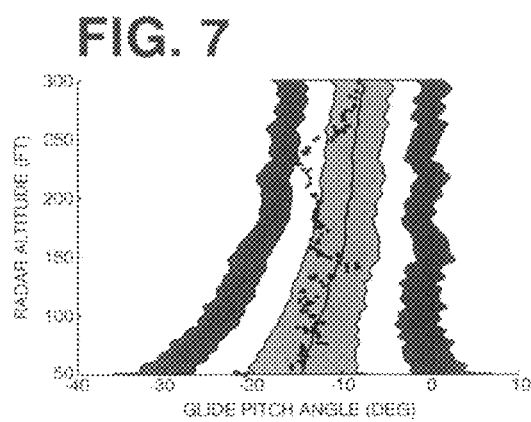
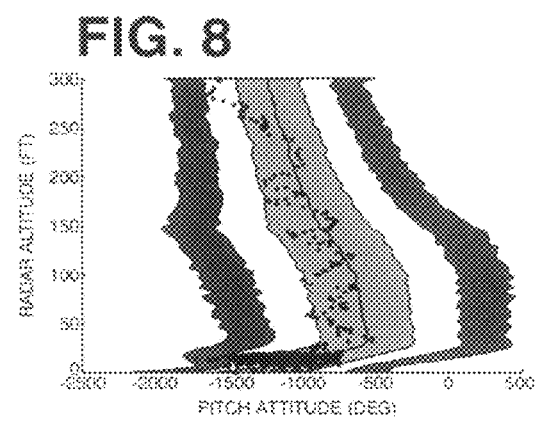
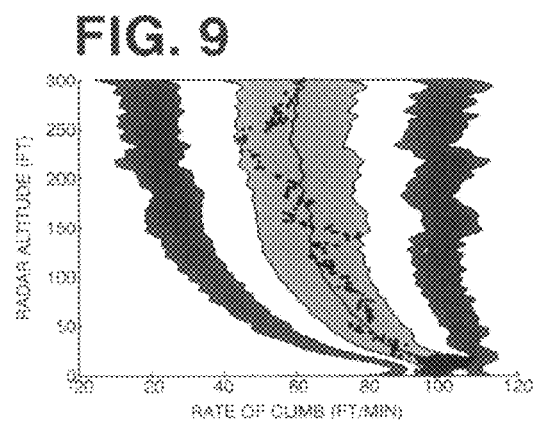

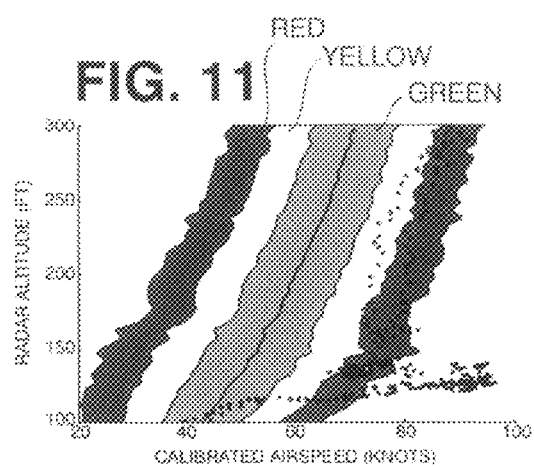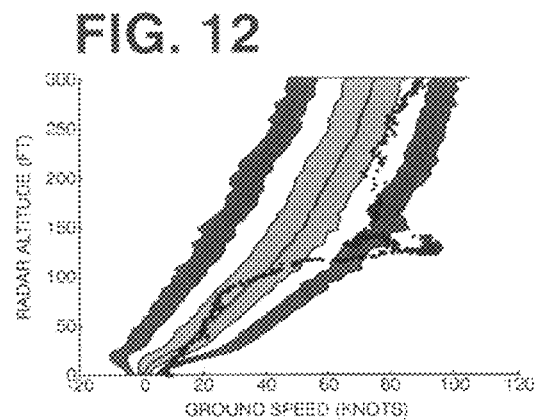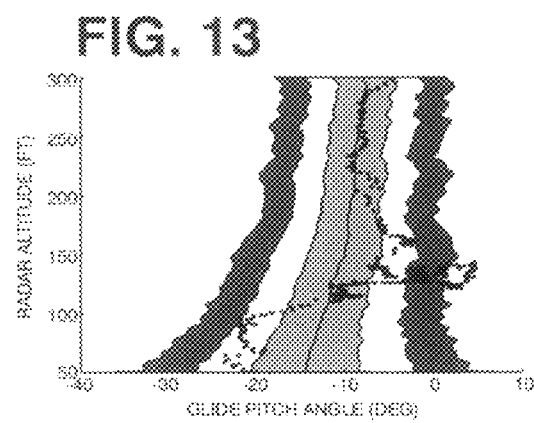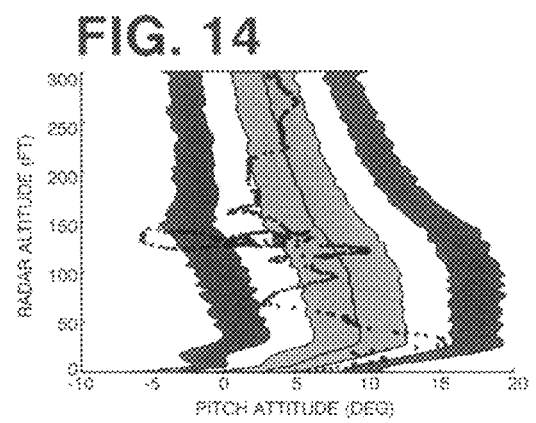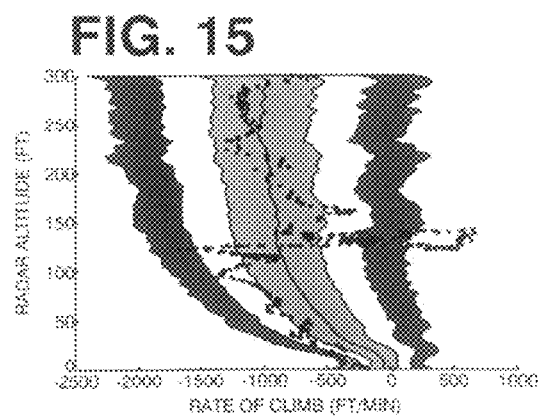

BASELINE COMPARATIVE LEADING INDICATOR ANALYSIS

STATEMENT OF GOVERNMENT INTEREST

The invention described herein may be manufactured and used by or for the Government of the United States of America for governmental purposes without payment of any royalties thereon or therefor.

CROSS-REFERENCE TO RELATED APPLICATIONS

This application is related to U.S. nonprovisional patent application Ser. No. 12/006,753, filing date 20 Dec. 2007, incorporated herein by reference, invention title "Intelligent Leading Indicator Display," joint inventors Eric J. Silberg, Phong Hua Nguyen, Daniel P. Everson, and Naipei P. Bi.

BACKGROUND OF THE INVENTION

The present invention relates to prediction of events, more particularly to predictive and informative methods that involve leading indicator analysis.

Leading Indicator (LI) analysis is a methodology of predicting future events based on past performance. It involves a measurement or combination of measurements that, when properly analyzed, can provide a prediction of a potential future occurrence. Leading indicators are used regularly in business and finance to predict performance (e.g., of a company or an industry) for purposes such as making more informed investment decisions.

Leading indicator analysis is now beginning to make its way into aviation safety realms with various aims, such as prediction (and hopefully, avoidance) of mishaps, maintenance or improvement of efficient operating practices, evaluation of training methods, and identification of underperforming (or outperforming) pilots or aircraft. Leading indicators can be used for evaluating many aspects of aircrew and aircraft performance. Leading indicator analysis can be applied to any observable or experiential system of or related to an air vehicle—that is, any system that has or can have data associated with it, including engines, structural components, pilot, and aircrew.

Current leading indicator approaches typically rely on comparing data to a desired outcome. For instance, let us assume that, according to a "rule," a commercial aircraft is not supposed to exceed an air speed of 700 knots during normal operations. According to a conventional leading indicator analytical method, flight data is analyzed to determine whether or not any pilots have exceeded this air speed limit. This kind of approach—in which comparison of data is made with respect to a "rule"—is inherently constrained in that it requires that limits be known, documented, and identifiable in the available data.

Conventional leading indicator analysis methods are "rule comparative" in nature. A rule comparative leading indicator (RCLI) compares an individual event to one or more "rules" that have been established. By setting one or more limits, a "rule" serves to guide, prescribe or prohibit conduct, action or behavior. For instance, in the aircraft safety realm, an RCLI can compare an individual flight to regulations, restrictions, standard operating procedures, and/or system operating limitations, to determine compliance of the individual flight in one or more of these respects. An RCLI is obtained through analyzing data from a single flight, followed by comparing these data to a set of predetermined rules.

RCLI analyses can indicate aircrew compliance or noncompliance with rules and guidelines, or can indicate systems operation inside or outside prescribed limits. Violation of policy may be interpreted as a precursor to a mishap, i.e., as a leading indicator to a potential mishap. Similarly, an indication of system operation beyond prescribed limits may be interpreted as a leading indicator to a system failure or malfunction, or to an accelerated usage rate. If a leading indicator is addressed, this might prevent occurrence in the future of the undesirable circumstance. RCLI analyses can be conducted to identify not only policy violations but also policy near-violations as well as unsafe (albeit technically or marginally compliant) practices.

Leading Indicator analysis is typically multidimensional, concerning multiple aspects and yielding multiple pieces of information per aspect. Often the resultant data do not lend themselves to display via standard techniques of plotting or data visualization. The kind of information generated through leading indicator analysis may be understood by an expert or analyst, but a decision-maker may be hard pressed to make much sense of it.

Currently unknown is an automated system for presenting leading indicator analytical information directly to decision-makers in a manner easily intelligible to them. Conventional presentational methods usually constitute manual assemblages of information by analysts and experts, compiled into reports or slideshows, and then presented to the decision-makers. An automated, straightforward, and easily comprehensible presentation method is needed in order to utilize leading indicator analytical information to the fullest.

Many modern aircraft are equipped with at least one advanced aircraft data recorder (ADR), designed to track maintenance-related information. A maintenance-dedicated ADR may encompass system fault information, mechanical parameters, flight control parameters, air data, or other data deemed relevant to system diagnostics or prognostics. Automatically and continually, the data are collected and processed using onboard diagnostic systems and/or specially configured ground stations post-flight. The recorded data are designed to be used for specific purposes, typically for fault-based maintenance and/or condition-based maintenance and/or component usage tracking, depending on the maintenance scheme implemented for the aircraft or subsystem.

Present day aircraft data recorders enable flight data analysis that is continual, rather than only if a mishap occurs. Aircraft data recorders may contain various types of data including systems data, flight parameters data, control inputs and outputs, and flight events (e.g. stall, weight-on-wheels, gear movement, etc.). Because these aircraft data recorders are principally used for maintenance, they are downloaded on a regular basis. In contrast, "crash survivable" data recorders are downloaded only after a mishap. Although ADR usage has been primarily relegated to supporting maintenance processes, the potential exists for harvesting much more information from these recorded data, using modern methods of data analysis and advanced statistical analysis. Technical specifications for these types of data—e.g., recording rate, accuracy, precision, resolution, and the conditions under which the data are recorded—may also be useful.

Through the years there have been various initiatives to improve flight safety and maximize operational efficiency. New regulations have built upon preceding regulations to improve the safety of aircraft, both mechanically and operationally. With reference to FIG. 1, technical and programmatic changes effected by United States Naval aviation have resulted in significant safety improvements and associated mishap reductions. On the one hand, the recent U.S. Naval aviation mishap rate is a fraction of what it once was; on the other hand, the recent U.S. Naval aviation mishap rate has stabilized in the last decade or so, no longer showing a decreasing trend. Safety issues similarly remain for commercial airlines to address. Future breakthroughs in flight safety may have much to do with greater abilities to derive valuable safety information preemptively rather than after the fact.

SUMMARY OF THE INVENTION

In view of the foregoing, an object of the present invention is to provide a better leading indicator analysis methodology. A further object of the present invention is to provide a better leading indicator display methodology. Other objects of the present invention include providing such LI analytical and LI display methodologies that are especially propitious for flight safety applications.

As discussed hereinabove, in the aircraft safety realm the potential exists for leading indicator analyses to further: diagnostics, prognostics, and condition-based maintenance of aircraft systems and components; objective assessments of aircrew performances; prevention of future mishaps; and, investigation of past mishaps. Two types of leading indicator can be useful for these and other purposes. The first type, referred to herein as a "rule comparative" leading indicator (acronymically designated herein "RCLI"), is conventionally used in various disciplines. The second type, referred to herein as a "baseline comparative" leading indicator (acronymically designated herein "BCLI"), is a novelty that is featured by the present invention. The present invention's BCLI analysis breaks new ground in the area of aircraft data analysis and in other areas.

Rule comparative leading indicators determine compliance with existing "rules." Generally speaking, rule comparative leading indicators are simpler than baseline comparative leading indicators. For instance, in the aircraft safety realm, RCLI analysis typically compares an individual flight to regulations, restrictions, standard operating procedures, or system operating limitations. In contrast, the present invention's baseline comparative leading indicators are more complex than rule comparative leading indicators. For instance, in the aircraft safety realm, the present invention's BCLI analysis typically involves: evaluation of a large number of flights to determine how "normal" operations appear in the data; then, comparison of individual flights to this "norm" (synonymously referred to herein as "baseline") to look for "outliers" (synonymously referred to herein as "anomalies").

Rule comparative leading indicators involve comparison of an event (such as a flight) to a "rule," i.e., a known standard. In contrast, the present invention's baseline comparative leading indicators involve comparison of an event (such as a flight) to a "baseline." The inventive BCLI analytical methodology accounts for the fact that many incidents (e.g., airplane mishaps) are caused by actions or failures that were not previously known or tracked. Baseline comparative leading indicators can be utilized to identify abnormal behavior in a system in which limits are unknown, or in a system in which limits are known only to indicate actual failure, rather than impending or potential failure.

In terms of springboard information, the present invention's BCLI analysis requires only the availability of historical data. The historical data is inventively transformed into a "baseline," which is typically a mathematical device that is informative, indicative or representative of the historical data. Current data is inventively compared to the baseline, thereby searching for "anomalies" ("outliers") in the current data versus the baseline. Known limits are usually not required for an effective application of the present invention's BCLI analytical principles with respect to a given system. Typically, inventive practice requires available data, but does not require known limits; nevertheless, the inventive BCLI analytical methodology as sometimes practiced does incorporate known limits to utilize for purposes such as event detection and trending.

Typical inventive practice involves comparison of real current data to real historical data. Inventive practice can involve non-real historical data—i.e., historical data that is assumed, contrived, configured, hypothetical, imaginary, fictitious, etc.—instead of or in addition to real historical data. According to such inventive embodiments, real current data can be inventively analyzed with respect to non-real data for which the corresponding baseline(s) is/are characterized by limitations or distributions that are at least partially based on non-real data.

The inventive method, as typically embodied, provides for a determination of a "baseline" for normal operations. The present invention's baseline does not rely on published or customary standards or limits; instead, the present invention's baseline is founded on characterization of the typical state of an aircraft in standard operational circumstances. Inventive baselines may be determined for many systems, flight maneuvers, and flight phases. The results of inventive BCLI analysis frequently include a series of envelopes that characterize the data for these maneuvers. The baselines can be constantly updated with each flight, but will generally be stable after a statistically significant amount of data is collected.

As a general guiding principle for inventive practice, an inventive baseline should describe a relatively smooth statistical distribution, referred to herein as a "normal" distribution. If the baseline is skewed or one-sided or otherwise manifests a "non-normal" distribution, it should be transformed into a normal distribution in order to be used effectively in inventive practice. A baseline should be characterized by a sufficient degree of normalcy to impart validity to a comparison of current data to the historical data represented by the baseline. If a baseline cannot be transformed into a normal distribution, it will likely be unsuitable or impractical for use in inventive practice.

According to frequent inventive practice, identification of a BCLI requires comparison of a single flight with respect to a baseline. If this single flight does not fall within the normal range of the baseline (typically 1.5 to 2 standard deviations from the median), it will be considered an "outlier" ("anomaly") and hence a potential leading indicator. As the number of data sets contributing to the baseline grows, the baseline's essential character ("distribution") should not change unless there is a change in behavior.

A changing baseline, in and of itself, can be a BCLI. For instance, let us assume that a baseline is formulated from multiple historical (previous) flights. As the number of flights contributing to the baseline grows, this distribution should not change in the absence of behavioral change. Therefore, if a baseline changes significantly in character over time and through increases in data, this significant change in character may represent a baseline comparative leading indicator.

To recapitulate, the present invention's baseline comparative leading indicator (BCLI) analysis is a unique methodology for determining a leading indicator of a system. The inventive method, as usually practiced, includes providing historical data (e.g., a statistical set or analysis of historical data) and comparing current data to the historical data. The comparing of the current data to the historical data includes detecting of "anomalies" ("outliers") of the current data versus the historical data. The inventive method often further includes predicting of future occurrences based on the comparing of the current data to the historical data.

A baseline comparative leading indicator does not require prior knowledge of limits, envelopes, or procedures in order to operate. The present invention's unique approach of anomaly detection and leading indicator identification does not require knowledge of the operational limits of a system. Rather, inventive BCLI analysis uses historical data to analyze and characterize new data. Furthermore, inventive BCLI analysis can detect anomalous behavior in sets of data where operation is always within established limitations.

A typical embodiment of the present invention's BCLI analysis includes two main components, viz., (i) baseline determination for normal operations, and (ii) comparative data set analysis. Inventive determination of a baseline for normal operations does not rely on published standards or limits, but rather on characterizing the typical state of the data through statistical analysis. Once a baseline is determined, it is utilized through comparison with a new data set. The new data set must also be statistically analyzed in a manner consistent with the baseline. Once it has been reduced, it may be compared to the baseline. If the statistics of the new data set do not fall within the normal range of the baseline (typically closer than 1.5 to 2 standard deviations away from the mean), it will be considered an anomaly and hence a BCLI.

A BCLI can be used to detect abnormal behavior in any system. Baselines may be determined for any among diverse systems. The term "system," as used herein in context of inventive practice of baseline determination and/or BCLI analysis, broadly refers to any system, organization, unit, regime, aspect, mode, condition, organism, etc. characterized by parts, components, ingredients, constituents, elements, properties, etc.

The present invention's BCLI analysis can be propitiously practiced to detect abnormal pilot behavior, regardless of whether such behavior is justified by influencing factors. Inventive BCLI analysis can bring to light an otherwise unseen practice or performance deficiency. Consequently, the issue can be addressed, using inventively obtained objective information, before it becomes a contributing causal factor of a mishap. Another possible area of inventive BCLI analysis in the aircraft safety realm is the detection of abnormally functioning systems, regardless of whether such systems otherwise reveal signs of fault. Inventive BCLI analysis can identify anomalous systems by comparing one flight of a single aircraft to either (a) a baseline of flights of a fleet of aircraft, or (b) a baseline of flights of the subject single aircraft.

Once a BCLI is detected via the inventive leading indicator methodology, this does not necessarily imply that the inventively detected BCLI is of extreme or monumental importance. One or more systems experts will usually be required to assess the importance of the BCLI, and to further assess whether and what action, if any, should be taken.

In addition to the baseline comparative leading indicator (BCLI) analytical methodology, the present invention provides an intelligent leading indicator display (ILID) methodology. The inventive ILID methodology, as typically practiced, provides a system for presenting multi-dimensional information regarding leading indicators in a clear, easily comprehensible manner.

Inventive ILID practice is especially propitious when brought to bear on inventive BCLI data or when otherwise associated with inventive BCLI analysis practice. According to typical practice of the inventive BCLI analytical methodology, a single occurrence of an event (a "current" event) is compared to a large set of similar events ("historical" events). Each historical event is analyzed and scored based on a number of criteria. Scores for each criterion are compiled to form a "baseline," viz., a descriptive set of data representing the large group. The statistical distribution of the baseline is computed and defined by at least one conventional statistical criterion, selected from conventional statistical criteria including but not limited to mean, median, mode, standard deviation, and skewness. Each criterion can have associated therewith its own individual baseline. Alternatively, two or more criteria can have the same baseline associated therewith; that is, plural criteria can be combined to form a "blended" baseline.

Each single event of interest is compared to at least one baseline, each baseline corresponding to one or more criteria. Where the single event falls on the baseline distribution provides an indication about that event—e.g., how that event was executed—compared to the large set of similar events, which is represented by that baseline. The present invention's ILID, as frequently embodied, provides a method to present this kind of information, the method including display of (i) one or more color-coded "bars" (e.g., horizontal bars), each bar representing a baseline; and, (ii) one or more contrasting "sliders," each slider representing the single event of interest and being informatively positioned along one of the bars. Each bar is color-coded so as to be segmented into plural "bands" (also referred to herein as "ranges"), each band having a color that is sufficiently contrastive vis-à-vis the other bands. Depending on the inventive embodiment, adjacent bands of a given bar can be distinctly demarcated, or can be indistinctly demarcated so as to appear to merge into one another.

The present invention's ILID methodology provides a quick and effective vehicle for imparting complex data, particularly to non-technical people—e.g., managers, officials, and decision-makers who are not technically savvy in the subject matter but who need to comprehend the complex data. Most people will easily become accustomed to "reading" inventive ILID displays, because inventive ILID displays are attributed with a kind of "intuitive grasp-ability." The present invention's ILID can display all of the pertinent data, all at once, in an easy-to-understand, intuitive manner. In contrast, tabular methods of data presentation can show numbers/values but lack an inventive ILID's "at-a-glance" elegance and lucidity. Furthermore, an inventive ILID display can be embodied in a customizable or automated fashion to afford flexibility or consistency in displaying a variety of leading indicator information.

Moreover, an inventive ILID system may intrinsically afford an effective way to see the "big picture." Inventive ILID practice can serve to evaluate the performance of the "large set" (e.g., a fleet of air vehicles) through inspection of the graphical baseline. This can permit identification of events that require fleet-wide attention. An example of this can be seen in the eighth criterion from the top, where the mean is skewed heavily to the right, and the second standard deviation does not show. This would imply that this particular criterion is being executed neither well nor consistently in the large sample set.

Incorporated herein by reference is the following paper, co-authored and presented at a 2007 conference by present inventors, which discloses some aspects of the present invention: Eric J. Silberg, Phong Hua Nguyen, Daniel P. Everson and David Wilson, "Leading Indicators—A Powerful Tool to Improve Rotorcraft Safety," presented at the International Helicopter Safety Symposium, Montreal, Canada, 19-21 Sep. 2007.

Other objects, advantages and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 2 shows two engine vibration distributions, one distribution for an individual aircraft and the other distribution for a historical set of other aircraft.

FIG. 4 shows a comparison, in terms of thirteen different criteria relating to an aircraft's approach to landing, between performance by an individual aircraft and performance by a historical set of other aircraft. FIG. 4 is also illustrative of an embodiment of the present invention's Intelligent Leading Indicator Display (ILID) method. The comparison is drawn between: (i) a mean range and two standard deviational ranges, representative of performance by the historical set of aircraft in each of the thirteen criteria; and, (ii) a "slider," representative of performance by the individual aircraft, and shown relative to performance by the historical set of aircraft. The slider shown in FIG. 4 is a thin, white, rectangular, vertical geometric figure reminiscent of a horizontally movable control knob used for adjusting volume or other physical parameter on a radio or other electronic device. Based on the comparison displayed in FIG. 4, the landing performance of the individual aircraft is "average."

FIG. 5 through FIG. 9 are graphs relating to FIG. 4. Each of FIG. 5 through FIG. 9 portrays a particular criterion as a function of altitude, for both the historical set of aircraft (represented in as plotted bands) and the individual aircraft (represented as plotted points). FIG. 5 portrays airspeed versus altitude; FIG. 6 portrays groundspeed versus altitude; FIG. 7 portrays glide path angle versus altitude; FIG. 8 portrays pitch attitude versus altitude; FIG. 9 portrays rate of climb versus altitude. The two-dimensional historical data ranges in FIG. 5 through FIG. 9 correspond to the one-dimensional horizontal historical data ranges shown in FIG. 4.

FIG. 4 and FIG. 10 are illustrative of the same embodiment of the present invention's Baseline Comparative Leading Indicator Analysis (BCLIA) method and the same embodiment of the present invention's Intelligent Leading Indicator Display (ILID) method, but with each having a different individual aircraft being evaluated relative to the same set of historical aircraft. The performance data for the historical set of aircraft are identical in FIG. 4 and FIG. 10; that is, the one-dimensional horizontal historical data ranges shown in FIG. 10 are identical to the one-dimensional horizontal historical data ranges shown in FIG. 4. The dissimilarity between FIG. 4 and FIG. 10 lies in the performance of the individual aircraft in the various criteria. Based on the comparison displayed in FIG. 10, the landing performance of the individual aircraft is "below average."

FIG. 11 through FIG. 15 are graphs relating to FIG. 10 that are similar to FIG. 5 through FIG. 9, respectively. FIG. 11 portrays airspeed versus altitude; FIG. 12 portrays groundspeed versus altitude; FIG. 13 portrays glide path angle versus altitude; FIG. 14 portrays pitch attitude versus altitude; FIG. 15 portrays rate of climb versus altitude. The performance data for the historical set of aircraft in FIG. 5 through FIG. 9 are identical to the performance data for the historical set of aircraft in FIG. 11 and FIG. 15, respectively; that is, the two-dimensional historical data ranges shown in FIG. 11 through FIG. 15 are identical to the two-dimensional historical data bands shown in FIG. 5 through FIG. 9, respectively.

FIG. 16 is analogous to FIG. 4 and FIG. 10 insofar as an individual aircraft is evaluated relative to a set of historical aircraft. The graph shown in FIG. 16 differs, in terms of inventive mode of ILID presentation, from the graphs respectively shown in FIG. 4 and FIG. 10.

FIG. 17 is distinguishable, for instance, from FIG. 2, FIG. 4, FIG. 10 and FIG. 16, each of which is illustrative of event-versus-baseline comparison as revealing one or more baseline comparative leading indicators in accordance with the present invention. As shown in FIG. 17, the x-axis values are increments of time (weeks, as shown), and the y-axis values are dimensionless values set forth merely for illustrative purposes.

DETAILED DESCRIPTION OF THE INVENTION

The inventive BCLI analysis methodology and the inventive ILID methodology were tested by the United States Navy in association with various types of Naval aircraft having onboard data collection systems. The below-described examples of inventive practice derive from the U.S. Navy's testing of the inventive methodologies.

Example 1

Engine Vibration

A manufacturing defect in a specific lot of aircraft engines caused a number of catastrophic failures. This in turn caused significant damage to multiple aircraft. The question was raised as to whether or not existed, prior to failure, any leading indicators of failure or abnormal operation. The type of aircraft involved has a robust onboard data collection system with ample data for conducting comparative analyses in accordance with the present invention's BCLI analystical methodology. With a view toward identifying anomalous behavior, vibration data from the engine that failed was compared to engine vibration data from roughly 4,000 flights of other aircraft with similar engines. The 4,000 flights constituted the baseline for this inventive BCLI analysis.

Figure 1:
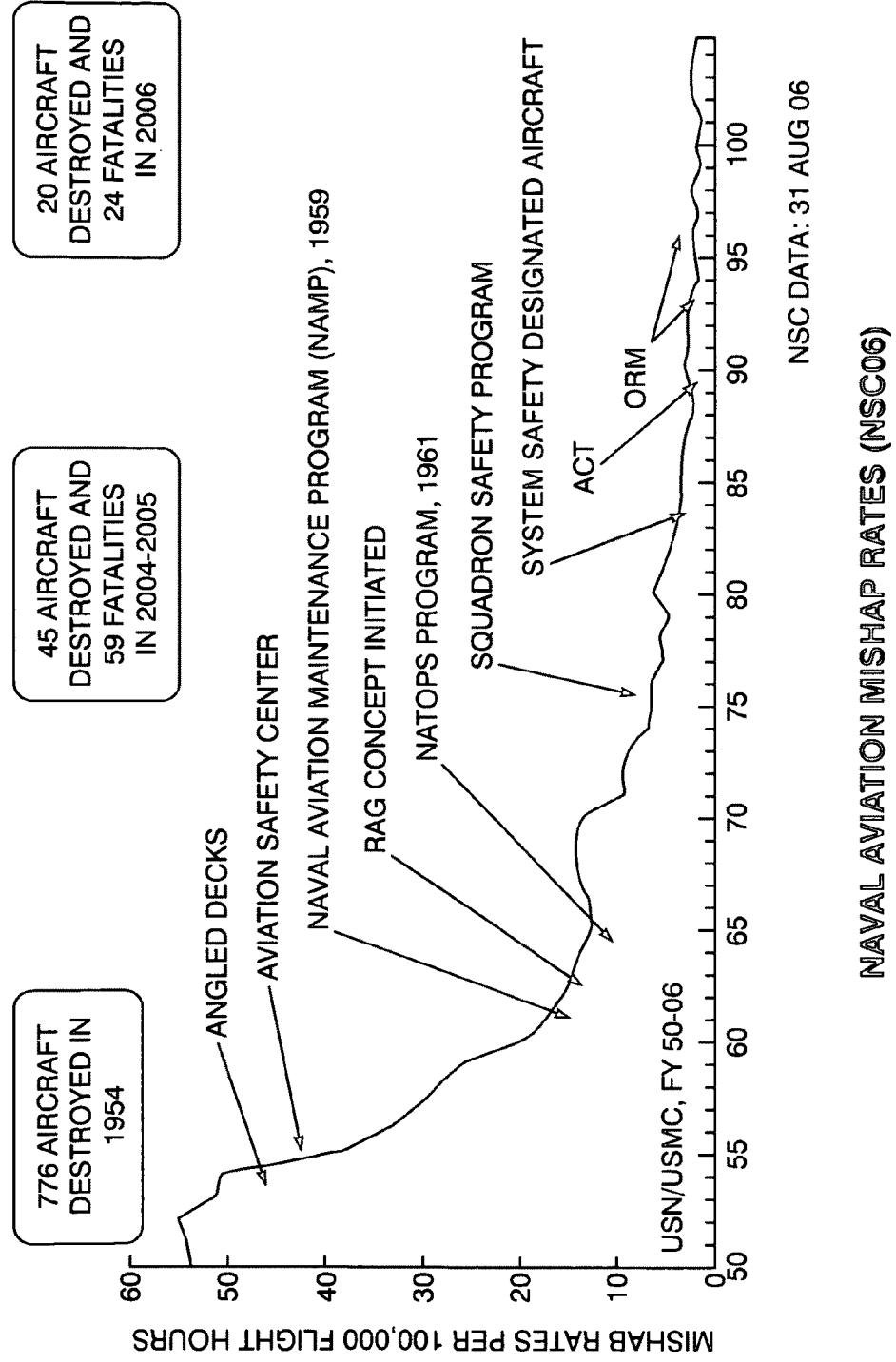
FIG. 1 is a graph of U.S. Naval aviation mishap rates between 1950 and 2006, taken from a presentation at the 2006 Tailhook Convention, Reno, Nev., 7-10 Sep. 2006.
Figure 2:
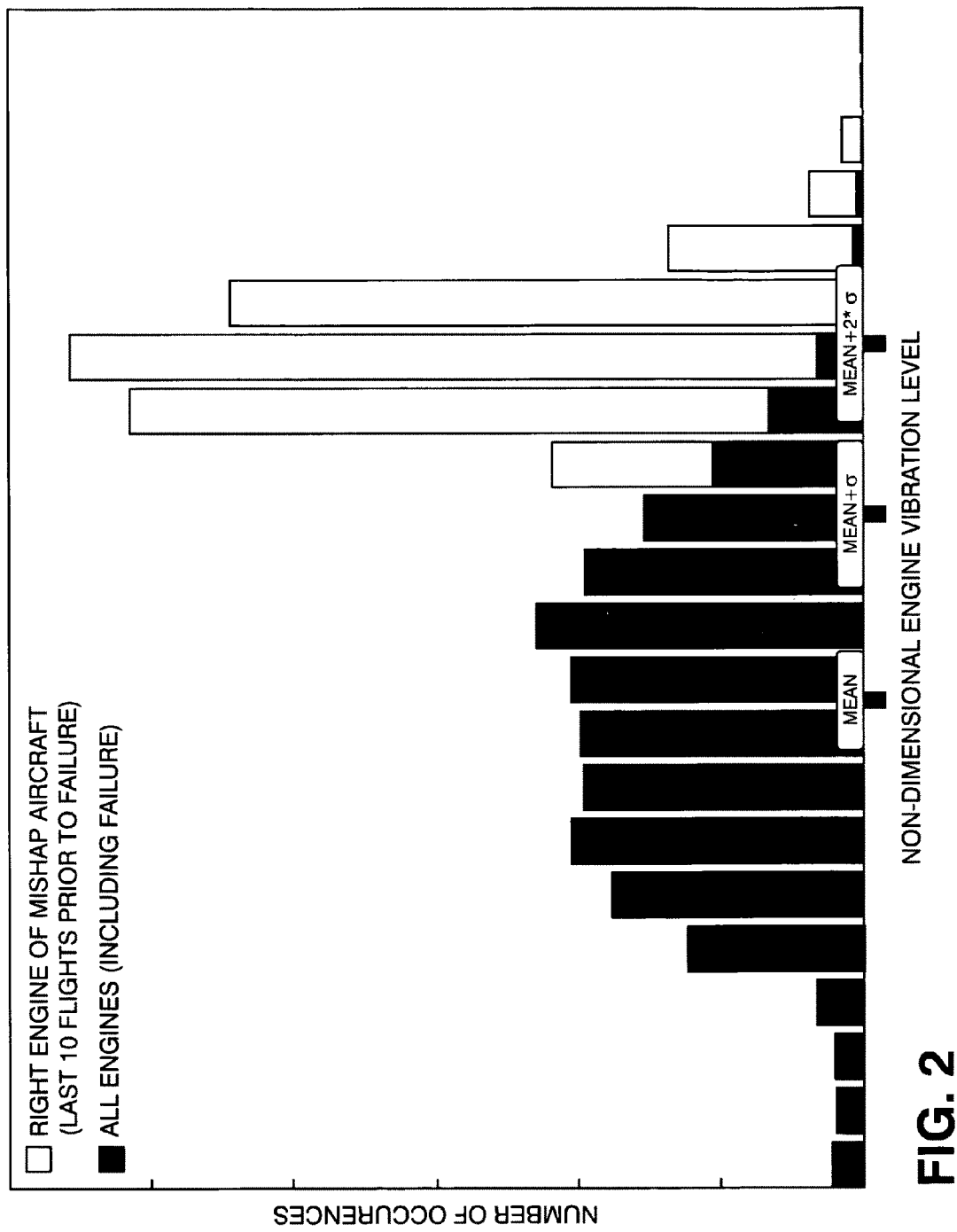
FIG. 2 is a graph illustrative of an embodiment in accordance with the present invention's Baseline Comparative Leading Indicator analytical method.

With reference to FIG. 2, the distribution of the vibration data (referred to herein as the "vibration signature") from the known failed engine is compared with the vibration signature of the baseline. It is seen in FIG. 2 that, as compared with the baseline engines, the failed engine's signature is notably greater in magnitude prior to its failure. This does not indicate that the vibrations trended higher prior to failure; rather, this indicates that the engine exhibited a regular level of vibration higher than the normal fleet value for that engine. None of these flights showed vibration levels higher than the value specified as safe for that engine.

Thus, the abnormally high vibration signature of the known failed engine, vis-à-vis the vibration signature of the baseline, constituted a BCLI. Subject matter experts were called in to assess the significance of an abnormally high engine vibration signature in the context of inventive BCLI analysis, albeit the engine vibration signature was within specified limits of the applicable standard. The subject experts confirmed that the engine vibration was within the ostensibly acceptable vibration limits, but acknowledged the abnormality of the engine vibration based on the inventive BCLI analysis.

It was determined by the subject experts that the actual defect in the engine could not be detected prior to failure. It was suggested by the subject experts that the higher-than-normal vibration may have aggravated the material problem, potentially causing failure earlier than expected. Further analysis detected another in-service engine with a similarly high vibration signature. While this other engine was known not to have the manufacturing defect, it did show a similar BCLI; this other engine continued to be flown and monitored.

Example 2

Approach and Landing

Pilot performance and proficiency are currently evaluated by instructor pilots ("IP"s), skilled aviators who greatly influence pilots in training. During a training phase, an IP will sometimes not be present in the cockpit with the student, thereby relying on the student's sensibilities for the student's self-evaluation. In addition, some subjectivity in grading criteria among different IPs is unavoidable.

The present invention's BCLI analytical methodology can represent an automated approach to evaluating pilot performance. The inventive BCLI analysis of flight data should not replace IP expert evaluation, but rather should supplement it by providing more objective measurement of pilot performance for various criteria in a training and evaluation environment.

"Approach-to-landing" (approach and landing) is a critical and rather well-defined phase of flight, and was selected as a test maneuver for inventive evaluation. With reference to FIG. 3 through FIG. 15, inventive baseline comparative leading indicator methodology was practiced to identify pilot underperformance based on historical data pertaining to the approach-to-landing phase. The inventive BCLI methodology was effectuated to compare individual approaches-to-landing with a baseline statistically determined from data aggregated from approaches-to-landing by a large sampling of squadron pilots for an extended period of time. Selected data criterion values were plotted for an individual approach-to-landing to show the amount each value deviated from the statistically derived norm.

Figure 3:
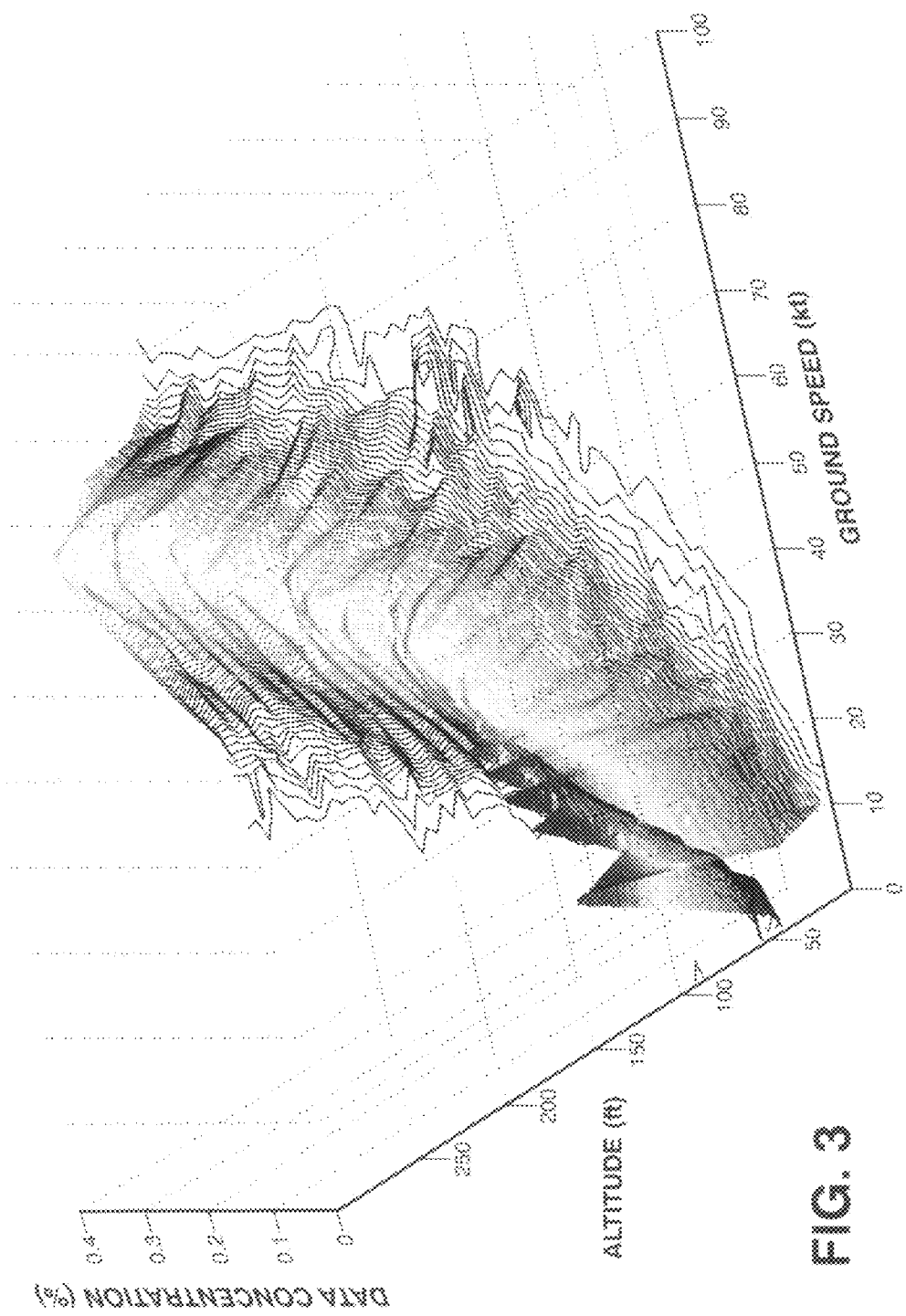
FIG. 3 is a graph of a distribution of altitude versus ground speed for a historical set of aircraft approaches to landings.

More than 2,600 landings were analyzed that took place over the course of two-and-one-half years in four helicopters with prototype flight data collection systems. Of the more than 2,600 approaches-to-landing over the 2½ year period, 943 were determined to fall within allowable margins for the selected criteria, and were used to derive the baseline data set to which individual approaches-to-landing could be compared. FIG. 3 shows the distribution of aircraft altitude over range of ground speeds for this baseline dataset.

The entire set of 2,000-plus landings was analyzed to form eleven baselines to which a single landing (or groups of landings) could be compared. Five general approach-and-landing parameters, each including one or more inventive "criteria," were tracked throughout a landing evolution, viz., airspeed, ground speed, pitch attitude, glide path angle, and rate of climb. For inventive analytical purposes, the landing evolution was divided into different criteria, each criterion falling into one of these general parameters. The Naval Air Training and Operating Procedures Standardization (NATOPS) Manual was used to select the eleven criteria to be utilized in applying inventive BCLI analytical methodology.

Figure 4:
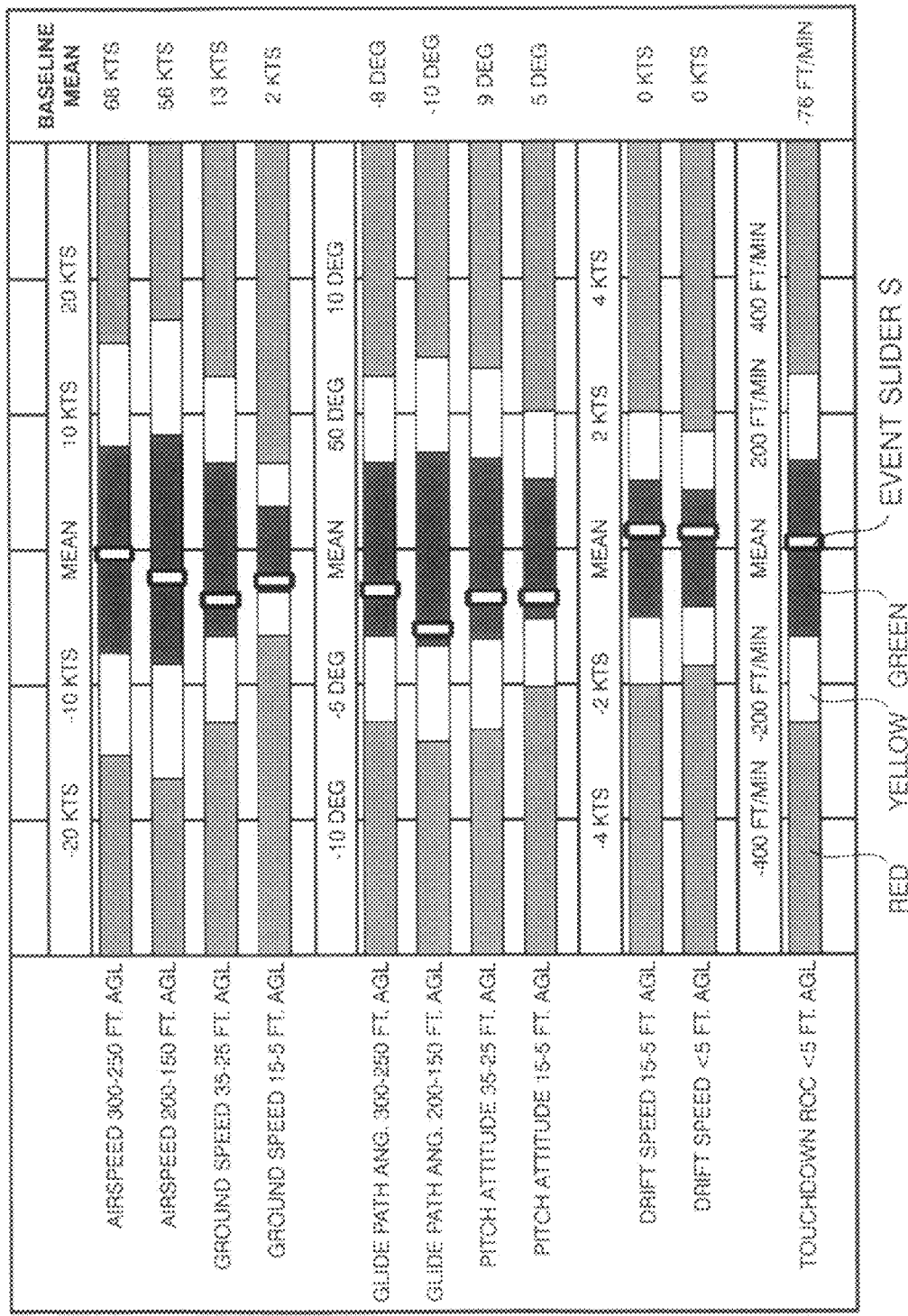
FIG. 4 is a graph illustrative of another embodiment of the present invention's Baseline Comparative Leading Indicator Analysis (BCLIA) method.

As shown in FIG. 4, the following eleven criteria, for normal approaches-to-landing for airfield landing patterns, were used to establish the baseline data set: airspeed at 300—250 feet above ground level; glide path angle at 300—250 feet above ground level; airspeed at 200—150 feet above ground level; glide path angle at 200—150 feet above ground level; ground speed at 35—25 feet above ground level; pitch attitude at 35—25 feet above ground level; ground speed at 15—5 feet above ground level; drift speed at 15—5 feet above ground level; pitch attitude at 15—5 feet above ground level; rate of descent at less than 5 feet above ground level; drift speed at less than 5 feet above ground level.

Still referring to FIG. 4, a baseline is determined for each criterion in accordance with inventive BCLI methodology. Each baseline is represented as a "banded" horizontal "bar" so as to allow a single landing to be visually assessed. According to usual inventive practice, each baseline-representative, criterion-related bar includes at least two "bands." Each band constitutes a region (e.g., section or segment) of a bar. FIG. 4 illustrates the eleven individual evaluation criteria and the baseline comparative evaluation for a typical landing. Each criterion is analyzed as a graphical bar representing a range of values. Each bar corresponds to its own individual criterion, and is broken down into bands according to the distribution of the corresponding baseline.

The comprehensive multi-color graphic display of FIG. 4 intelligibly presents a comparison of an individual approach-to-landing to the baseline, i.e., the statistically derived norm. As shown in FIG. 4, the color green indicates values within one standard deviation of the mean. The color yellow indicates transition values from one to two standard deviations from the mean. The color red indicates values greater than two standard deviations from the mean. The values of criteria from the individual approach-to-landing being compared to the baseline data set are depicted as white, black-outlined, vertical "event sliders S." Bands corresponding to statistical ranges are displayed on these plots as well. FIG. 4 shows this display for a typical landing.

In each horizontal bar shown in FIG. 4, the full range of values is centered upon the mean performance of the historical approach-and-landing data. That is, the mean value of the baseline data for each criterion is calculated and assigned a zero score, with deviations from this norm measured in standard deviations of the baseline data. Each criterion-related bar is sectioned into plural differently colored bands—three bands (red, yellow, green) as shown in FIG. 4. In each bar, the green band encompasses the range of values up to one standard deviation. The transition to yellow occurs at one standard deviation away from the mean. The yellow band encompasses the range of values between one standard deviation and two standard deviations. The transition to red occurs at two standard deviations from the mean. The red band encompasses the range of values over two standard deviations. Thin vertical dark (e.g., black) lines demarcating/delineating between bands (e.g., between green and yellow bands, and between yellow and red bands), such as depicted in FIG. 4, may be included in a bar to promote clarity, but are generally optional in inventive practice of the ILID mode shown in FIG. 4.

Each contrastively multi-banded horizontal bar has associated therewith one "slider." As depicted in FIG. 4, slider S is substantially white-colored to facilitate its visualization vis-à-vis the horizontal bar along which slider S "slides." The slider indicates the criterion value for a single landing. Where this slider falls on each baseline-representative, criterion-related bar indicates how that particular landing compares to the baseline. When the slider is in the green band (i.e., the green region of the bar), the performance with respect to that specific criterion is considered acceptable. When the slider is in the red band (i.e., the red region of the bar), the performance with respect to that specific criterion is considered poor, and is deemed to constitute a potential BCLI.

It is understood by the skilled artisan who reads the instant disclosure that contrasting colors, utilized in inventive practice are not necessarily relegated to the colors white, green, yellow and red. Neither the green-yellow-red color band scheme of the bars, nor the predominantly white color of the slider, is necessarily used in inventive practice. Nor is the horizontal orientation of the bars necessarily so, as the bars can have a non-horizontal (e.g., vertical) orientation. The overlying objective is for an inventive display to effectively convey the information it contains, and this typically entails utilization of contrasting colors and/or shades and/or patterns among bands and sliders. According to some inventive embodiments, the colors green, yellow and red are useful colors of bands in a bar, in a kind of analogy to a conventional three-color traffic signal, in which the green light signifies "go," the yellow light signifies "slow down, proceed with caution," and the red light signifies "stop." By analogy to this tri-color traffic signal scheme, in inventive practice the color green can signify comportment with respect to a baseline, the color yellow can signify moderate anomalousness/outlying with respect to a baseline, and the color red can signify severe anomalousness/outlying with respect to a baseline.

The individual criterion plots shown in FIG. 5 through FIG. 9 provide details beyond those provided by FIG. 4. FIG. 4 represents the corresponding baselines in a comprehensive display. Each of FIG. 5 through FIG. 9 illustrates one of the eleven criterion-related bands illustrated in FIG. 4. Shown in FIG. 5 through FIG. 9 are plots of airspeed, ground speed, pitch attitude, glide path angle, and rate of climb—throughout the evolution of the approach-to-landing. FIG. 5 through FIG. 9 are additionally informative about the specific performance of one flight, in terms of comparison with baselines corresponding to phases or stages occurring throughout the entire course of the landing evolution. As shown in FIG. 5 through FIG. 9, each plotted point represents one data point during the landing evolution. Each of the bands shown in FIG. 5 thorough FIG. 9 is identical to the corresponding criterion-related band shown in FIG. 4 insofar as being characterized by the same statistical range.

FIG. 4 demonstrates that all of the criteria for the individual flight of interest are in the green band, i.e., within one standard deviation of the baseline mean. Falling within the green region of every bar indicates, or tends to indicate, an acceptable performance. Even if a study of the individual criterion plots were to show an occasional excursion into the yellow region, these brief periods would likely not significantly degrade the criteria score.

Figure 10:
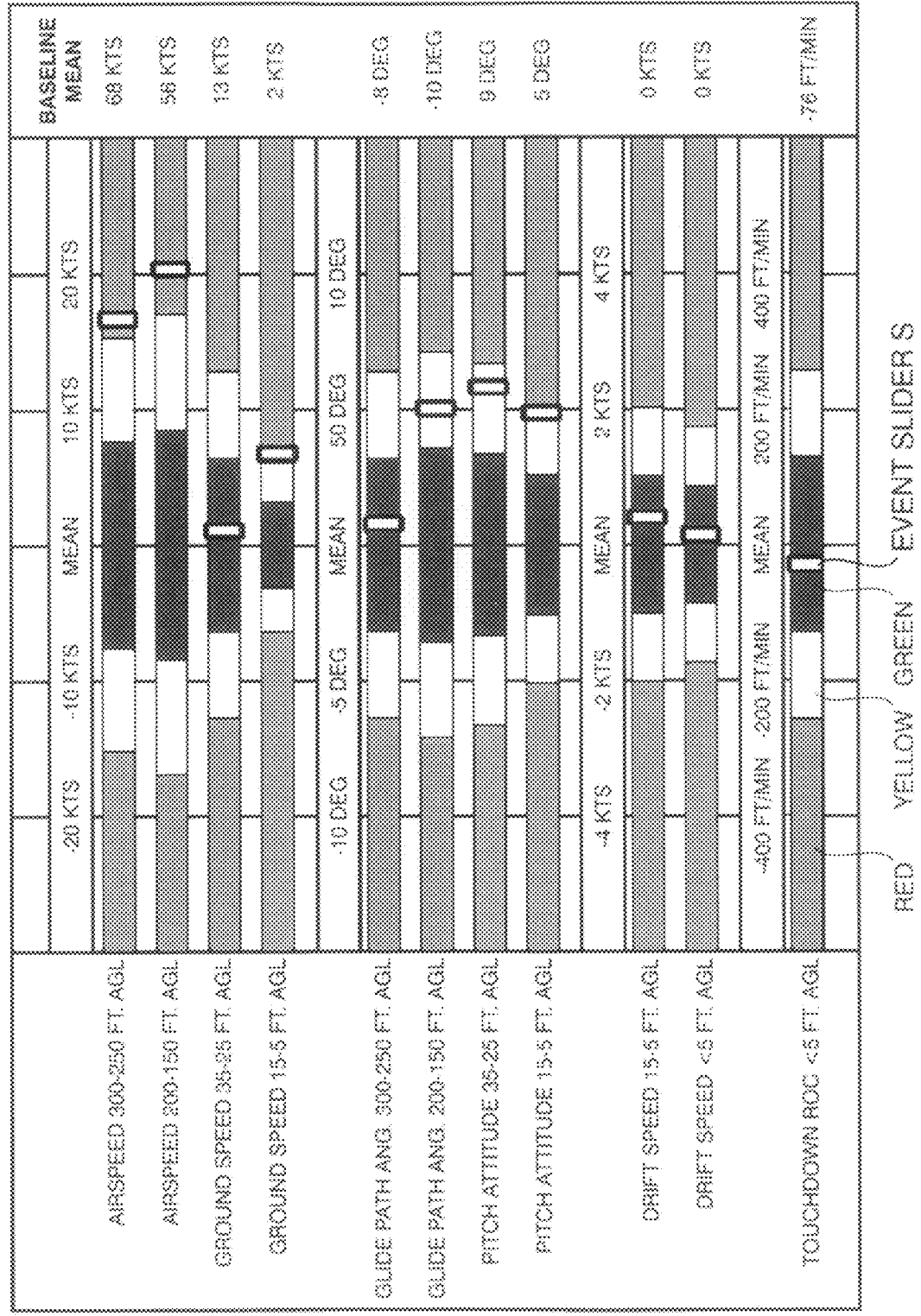
FIG. 10 is a graph similar to the graph shown in FIG. 4.

In contradistinction to FIG. 4, FIG. 10 shows an example of below-average landing performance. FIG. 11 through FIG. 15 pertain to FIG. 10 similarly as FIG. 5 through FIG. 9 pertain to FIG. 4. The outlying tendencies exhibited in FIG. 10 may constitute a BCLI of an underperforming pilot. FIG. 10 shows the individual performance, indicated by slider S, as falling in the yellow and red bands for each of several criteria, albeit not for all of the criteria. These anomalies (outliers with respect to the green band for a given criterion-related bar) are clear indications of a below-average or non-standard landing evolution. If this type of baseline comparative leading indicator were to regularly appear for a particular pilot, it could warrant further analysis and potential corrective action to reduce the likelihood of a mishap.

It is emphasized that practice of the present invention's BCLI analytical methodology does not preclude separate practice of conventional RCLI analytical methodology, which can also provide useful information. In other words, inventive BCLI analysis and conventional RCLI analysis can complement each other. In this example, in addition to the inventive BCLI analysis, an RCLI analysis was performed whereby each landing was compared to standard operating procedures ("SOPs") to ascertain compliance. If an absolute violation of procedure was detected, a rule comparative leading indicator (RCLI) was generated for that landing.

This example illustrates how combined practice of inventive BCLI analysis and inventive ILID display can yield quick and straightforward assessment of overall performance of aircraft pilots. Nevertheless, combined inventive practice should be regarded as providing and presenting useful information, but not as replacing a specially qualified individual (e.g., expert instructor or expert evaluator) who can interpret results and formulate a plan for correcting below average performance. The present invention's BCLI and ILID methodologies, practiced together, constitute a unique analytical tool for effecting automated comparison of selected events to statistically derived norms.

Inventive BCLI analysis does not require known or previously defined threshold values, but rather provides for derivation by the practitioner of the applicable baseline through analysis of a statistically significant data set determined by him/her to be representative of desired criteria. Results according to inventive BCLI analysis can be visualized according to inventive ILID display, which typically includes implementation of a multi-color-coded graph format. An inventive ILID graphical presentation is typically a kind of user-friendly "snapshot" view of a comparison that can be used to quickly gleam information. For instance, an inventive ILID graphical presentation can quickly convey incisive information concerning performance of a pilot, which is viewed relative to the baseline; moreover, a quick assessment can be made as to whether further research or analysis is indicated.

The inventive BCLI analytical methodology represents a potentially significant enhancement to existing evaluation methods. Inventive BCLI analysis brings the capability, for instance, to objectively compare a pilot's performance to a statistically derived baseline from similar maneuvers flown by other pilots within the same community. In addition, inventive BCLI analysis can easily trend a pilot's performance through the training and qualification process, and could lead to a Navy Standard Score (NSS) type grading for pilot training, with grades being determined by deviation from the validated norm. An objective standard score could help to minimize inconsistencies in grading among instructors, and could eventually evolve into a tool for assessing and tracking individual pilot performance throughout a flying career. The inventive BCLI analytical methodology can be applied to any aircrew or aircraft system performance issue that has a statistically significant data set from which to derive a baseline (norm). The potential of inventive BCLI analysis for improved objectivity in evaluating shipboard landings is especially noteworthy. Potential applications of inventive BCLI analysis are limited only by the availability of relevant data.

Example 3

Approach and Landing (Alternative Display)

Figure 16:
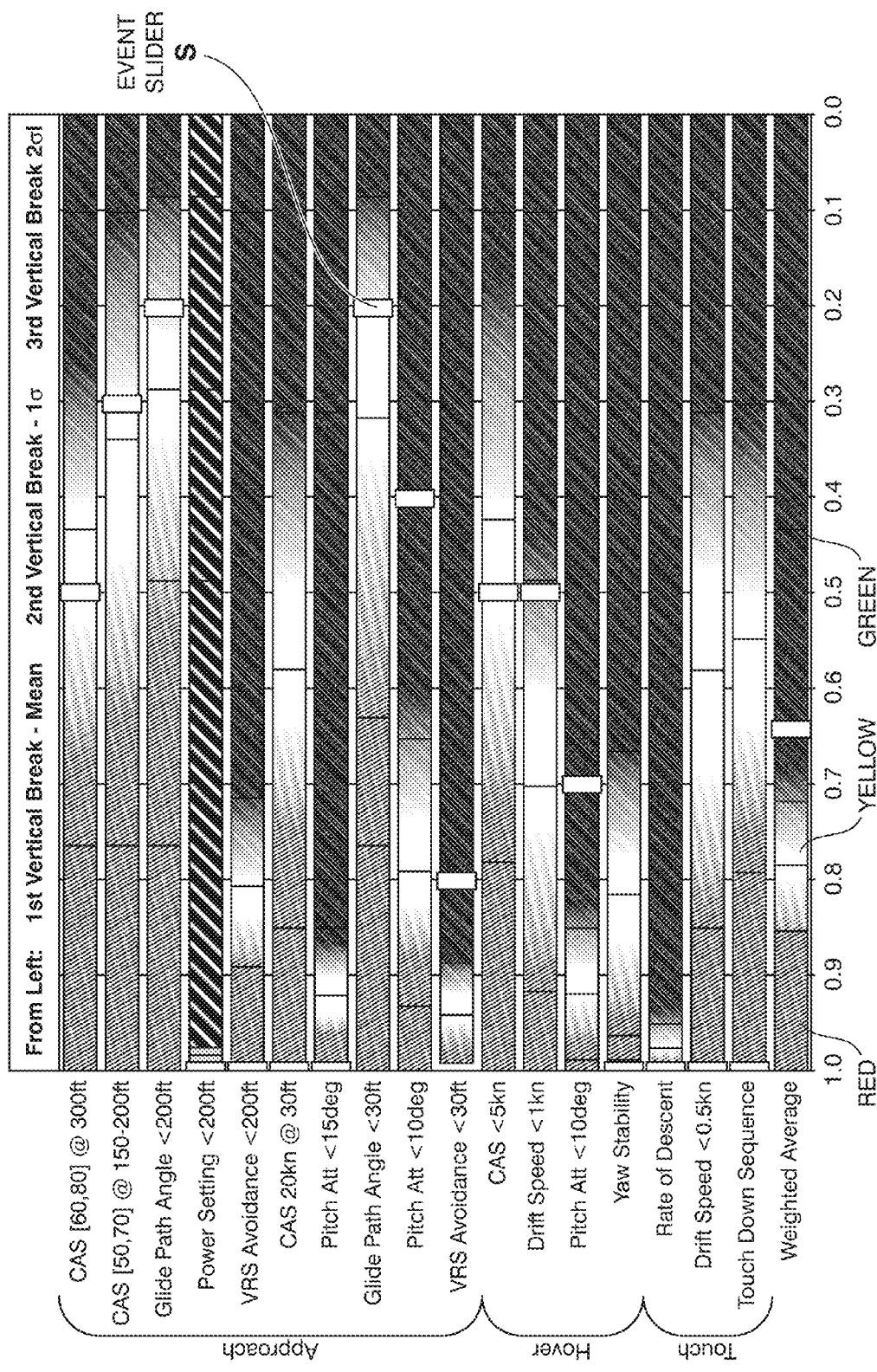
FIG. 16 is a graph illustrative of a different embodiment of the present invention's Intelligent Leading Indicator Display (ILID) method.

Reference is still made to FIG. 4 and FIG. 10 and is also made to FIG. 16. FIG. 16 is similar to FIG. 4 and FIG. 10 insofar as illustrating presentation of information by inventive ILID methodology using color-coded horizontal bars and contrasting sliders. In FIG. 4, FIG. 10 and FIG. 16, each color-coded bar represents a baseline, each bar is sectioned into differently colored bands, and each contrasting slider (indicated as slider S) represents a single event of interest. FIG. 4, FIG. 10 and FIG. 16 alike demonstrate how inventive BCLI analysis can involve multiple analyses. More generally, this multi-analytical genre of inventive BCLI practice is distinguishable from the uni-analytical genre of inventive BCLI practice, such as illustrated by FIG. 2. The latter is less complex, for instance based on a single parameter or criterion such as engine vibration; the former is more complex, for instance based on multiple parameters or criteria such as associated with landing performance evaluation.

The inventive ILID mode shown in FIG. 4 and FIG. 10 presents each baseline in three types of bands, viz., a green band (up to 1 standard deviation from the mean), a yellow band (1-2 standard deviations from the mean), and a red band (>2 standard deviations from the mean). The graphical presentation of the inventive ILID mode shown in FIG. 4 and FIG. 10 is centered about the green bands, each of which is in the middle of its bar. Each bar has: one medial greed band; two yellow bands adjacent to and on opposite sides of the red band; two red bands adjacent to the yellow bands and at opposite extremes of the bar.

FIG. 16 shows an inventive intelligent leading indicator display for an inventive baseline comparative leading indicator analysis of Navy helicopter landings. Several criteria critical to landing of a helicopter are addressed in FIG. 16. As depicted in FIG. 16, as to each criterion an individual performance, represented by an event slider S, can receive a score in a "one-to-zero" scale, an arbitrary range of qualitative values in which "one" represents the perfection extreme and "zero" represents the failure extreme. The abscissa of the graph describes a scale from one (on the lefthand side) to zero (on the righthand side). A "1" score is perfect, whereas a "0" score is failure; in other words, the closer to the left falls the slider, the better is the performance in the criterion to which the bar relates. Each baseline has associated therewith a bar and a slider that are paired and stacked to produce the portion of the inventive display that pertains to that baseline.

The inventive ILID mode shown in FIG. 16 presents each baseline as a bar having four bands or fewer. In FIG. 16, some bands contain two colors that transition into one another. The bands of each bar are differentiated by color or color combination, and are demarcated or delineated by dark (e.g., black) vertical lines through the bar. In each bar shown in FIG. 16, the bands are delineated by black vertical lines interior of the left and right ends of the bar. Vertical delineative lines are more important in this mode of inventive ILID practice than they are in the mode of inventive ILID practice portrayed in FIG. 4 and FIG. 10. In the mode of inventive practice portrayed in FIG. 4 and FIG. 10, each band of a given bar is solidly colored; accordingly, the distinctions or separations between bands generally are readily apparent even in the absence of vertical delineators between bands that may serve to accentuate the distinctions/separations. In contrast, the mode of inventive ILID practice shown in FIG. 16 typically involves some bi-colored bands that are intermediate some mono-colored bands.

As shown in FIG. 16, the entirely green segment, (first band from the left) represents performance at or above (better than) the mean. Color transition from green to yellow occurs in the transitionally green-to-yellow segment (second band from the left), which represents performance below (worse than) the mean and up to one standard deviation from the mean. Color transition from yellow to red occurs in the transitionally yellow-to-red segment (third band from the left), which represents performance below (worse than) the mean and between one and two standard deviations from the mean. The entirely red segment (fourth band from the left) represents performance below (worse than) the mean and greater than two standard deviations from the mean.

According to typical inventive practice, a slider in a red-colored area of the bar—whether in a transitional yellow-to-red band or a purely red band—would be considered an anomaly (outlier). Such would indicate that the event is statistically outside the range of normal operations, and in the direction considered to be "bad." The inventive ILID system should be considered to be intelligibly presenting data, rather than to be rendering profound judgments or wide-reaching conclusions. An inventive ILID typically displays metrics from a single event, relative to metrics of a large set of the same event. An expert should be availed of to read deeper and broader meanings into an inventive ILID.

Other delineative purposes of relatively thin dark vertical lines are possible in inventive practice, depending on the criteria of interest. For instance, if a rule violation is associated with a particular criterion that is represented by a graphical baseline bar, the rule violation can be indicated (e.g., via vertical line or narrow segment) in the context of the baseline bar; thus, a given bar can be "hybridized" so as to be informative of inventive BCLI-type comparison as well as of conventional RCLI-type comparison. Thus, if a particular performance falls within a "red" area of a bar and is on the "bad" side of a performance standard demarcated by a vertical line on the bar, this graphical circumstance may be doubly suggestive, viz., that the individual performance is unsatisfactory and that the performance standard is appropriately set.

Note in FIG. 16 that in the eighth graphical baseline bar from the top ("Glide Path Angle <30 ft"), the mean is skewed heavily to the right, and the second standard deviation does not show. Such an irregularity in a baseline may imply that the corresponding criterion is being executed neither well nor consistently in the large sample set. This is an example of possible inherent value of a baseline itself in conveying information about the "big picture" or "large set." This irregular baseline suggests that closer attention to and possible revamping of certain fleet-wide practices may be in order.

The inventive ILID mode portrayed in FIG. 4 and FIG. 10 is similar to, but also differs in significant respects from, the inventive ILID mode portrayed in FIG. 16. The inventive ILID mode of FIG. 4 and FIG. 10 is more "objective" in the sense that a statistical mean is centralized, and both "plus" and "minus" deviation therefrom is visualized. The various colors (red, yellow, green) are used in FIG. 4 and FIG. 10 to form uniformly colored bands that illustrate various ranges in terms of standard deviations with respect to the mean. In a horizontal graphical baseline bar: the lone medial green band represents up to one standard deviation from mean performance; the two yellow bands on opposite sides of the medial green band represent one to two standard deviations from mean performance; the two extreme red bands represent over two standard deviations from mean performance. The person who views this inventive ILID mode gains a quick grasp of comparative information, e.g., individual performance vis-à-vis historical performance.

As distinguished from the inventive ILID mode of FIG. 4 and FIG. 10, the inventive ILID mode of FIG. 16 intends to convey both objective/quantitative and subjective/qualitative information to the viewer. The ILID display of FIG. 16 is set up to "rate" performance on a horizontal scale from zero (worst; on the righthand side) to one (best; on the lefthand side). The colors themselves (green, yellow, red) do not strictly comport with the bands, as the intermediate bands in each bar are bi-colored. Somewhat analogously to the bands of the inventive ILID mode of FIG. 4 and FIG. 10, the bands of FIG. 16 denote ranges in terms of standard deviations with respect to the mean. However, as distinguished from FIG. 4 and FIG. 10, the colors of FIG. 16 connote varying degrees of "acceptability" of performance with respect to the "ideal" performance, designated "one" on the lefthand side of the x-axis. Hence, a slider falling in a green color area of a bar might suggest unequivocal acceptability, in a yellow color area of a bar might suggest marginal acceptability or marginal unacceptability, and in a red color area of a bar might suggest unequivocal unacceptability.

Example 4

Changing Baseline as Leading Indicator

Inventive practice such as described hereinabove with reference to FIG. 2, FIG. 4, FIG. 10 and FIG. 16 typically involves comparison of a historical data-based "baseline" with a current event. As previously mentioned herein, meaningful information can be inventively obtained by studying a baseline itself so as to discern how the baseline changes over time. For instance, further insight into U.S. Navy Fleet-wide performance can be seen by tracking changes in the baselines themselves. Changes in the averages and spreads of the data can indicate improvement or degradation in Fleet performance and consistency. This type of inventive BCLI analysis can also be applied to individual squadrons, or even to individual pilots, if enough data exists. This information may be used to assess training methods, complacency, or standardization.

Figure 17:
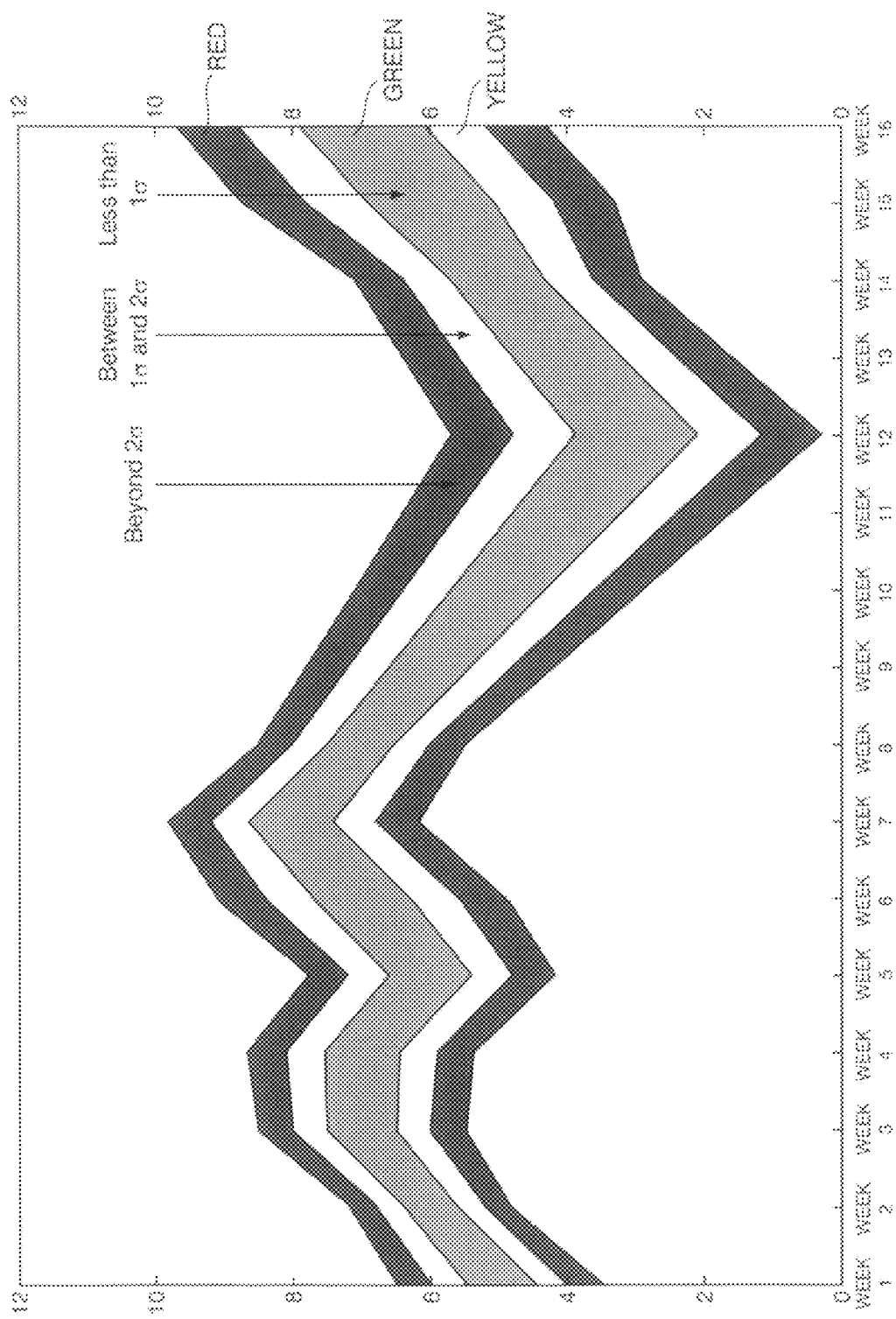
FIG. 17 is a graph illustrative of baseline-versus-baseline comparison as revealing one or more baseline comparative leading indicators in accordance with the present invention.

Reference is now made to FIG. 17, which illustrates how a changing baseline over time can be informative about the continued performance of a large data set. Otherwise expressed, the historical data itself can be continually re-evaluated so as to repeatedly apply the same statistical technique, with the same standard deviational values, to the continually updated data set. As shown in FIG. 17, a changing baseline is graphically represented over time so that baseline fluctuation is exhibited and measurable in terms of where the three standard deviational ranges fall in the context of the ordinate values, which are represented along the y-axis as a range of arbitrary dimensionless values from zero to twelve.

There is wide latitude for configuring an ILID display in accordance with the present invention. Generally speaking, the ultimate objective of a given inventive ILID is to meet the informational needs of the subject at hand. For instance, in an inventive ILID display of the kind shown in FIG. 4, FIG. 10 and FIG. 16, the criteria can be selected, ordered, demarcated, and/or banded in a variety of ways to suite the inventive practitioner.

Figure 18:
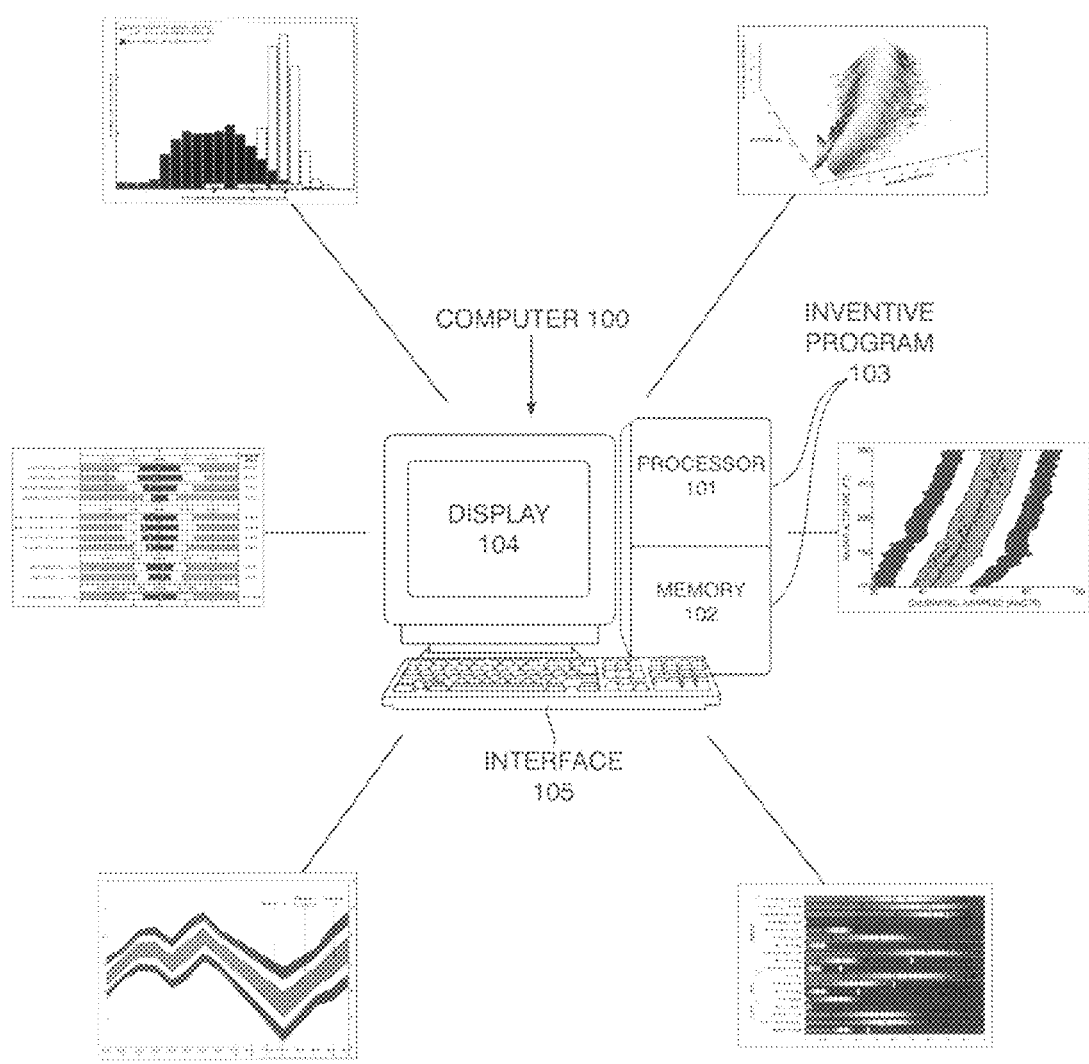
FIG. 18 is a schematic of a computer-related embodiment of BCLI analytical methodology and a computer-related embodiment of ILID methodology, in accordance with the present invention.

With reference to FIG. 18, An inventive ILID display can be generated by a computer system 100 that includes a processor 101, memory 102, a display 104, and a human interface 105. An inventive computer program product 103 is resident in the memory 102 of the computer 100 and has computer program logic recorded therein and embodied in computer code for enabling computer 100 to perform either or both of inventive BCLI analysis and ILID presentation. An inventive ILID can thus be displayed on a computer display 104, and rendered in hard copy via a printer. The present invention's computer program logic can be embodied, for instance, so as to be able to variously configure the inventive ILID display in accordance with particular needs, especially the information desired.

In accordance with some embodiments of the present invention, a computer program product is for residence in memory of a computer. The inventive computer program product comprises a computer useable medium having computer program logic recorded thereon. The computer program logic is embodied in computer code for enabling the computer to evaluate relative performance of an activity. The evaluation of relative performance includes (a) formulating a baseline, and (b) comparing at least one subject performance of an activity to the baseline. The baseline represents a statistical distribution for plural historical performances of an activity. The comparing includes determining the existence of anomalousness of the at least one subject performance with respect to the plural historical performances. According to some inventive embodiments, if the at least one subject performance is encompassed by the at least one statistical non-normative range, the comparing includes ascertaining the degree of anomalousness with respect to the statistical normative range. The ascertaining of the degree of anomalousness includes consideration of the situation of the at least one current performance relative to the statistical normative range.

In addition or alternative to the above, the present invention's computer program logic can be embodied in computer code for enabling the computer to graphically display relative performance of an activity. The graphical display of relative performance includes (a) displaying at least one bar, and (b) displaying at least one slider. Each bar corresponds to a criterion for performance of an activity. Each said bar represents a baseline describing a statistical distribution for plural historical performances of an activity with respect to the criterion. Each slider includes plural bands; at least one band represents a statistical normative range, and at least one band represents a statistical non-normative range. Each slider is visually situated upon a bar in either a statistical normative range or a statistical non-normative range. Each slider represents a subject performance of the activity with respect to the criterion to which corresponds the bar upon which the slider is visually situated.

Once the criteria are determined by an inventive practitioner, the entire combined inventive process of (i) BCLI analysis (including creation and updating of baselines based on historical data, and comparison of current data to historical data), and (ii) ILID presentation (including graphical representation of each baseline as a bar having bands, and disposition of sliders on the bars), may be inventively effected using an inventive computer program product 103. Alternatively, inventive BCLI analysis and inventive ILID presentation can each be independently practiced by way of computer program product.

Moreover, inventive practice can be automated through integration or networking of a local computer 100 (e.g., personal computer such as desktop or laptop) with an external database, electronic or non-electronic, such as contained in or associated with a central computer, host computer, server, data warehouse, repository, or library. Exchange (e.g., importation and exportation) of information can take place through communication of the local computer with the external database. The inventive computer program product 103 can render different ILID presentations according to different datasets obtained from the external database.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. A method for evaluating relative performance of an activity, the method comprising:
    formulating a baseline, said baseline representing a statistical distribution for plural historical performances of an activity; and
    comparing at least one subject performance of said activity to said baseline, said comparing including determining the existence of anomalousness of said at least one subject performance with respect to said plural historical performances;
    wherein said baseline includes at least one statistical normative range and at least one statistical non-normative range, and wherein said comparing includes graphically displaying said baseline and said at least one subject performance, said graphically displayed baseline visually differentiating between each said statistical normative range and each said statistical non-normative range, each said graphically displayed subject performance visually indicating situation upon said baseline in either of a said statistical normative range and a said statistical non-normative range.

2. The method for evaluating of claim 1, wherein if said anomalousness is determined to exist, the method further comprises recording at least one instance of anomalousness as being suitable for further investigation as a possible leading indicator.

3. The method for evaluating of claim 1, wherein said graphical displaying of said baseline and said at least one subject performance includes:
    displaying at least one bar, each said bar corresponding to a criterion for performance of an activity, each said bar representing a said baseline that describes a statistical distribution for plural historical performances of an activity with respect to said criterion, each said bar including plural bands, at least one said band representing a said statistical normative range, at least one said band representing a said statistical non-normative range;
    displaying at least one slider, each said slider being visually situated upon a said bar in one of a said statistical normative range and a said statistical non-normative range, each said slider representing a subject performance of said activity with respect to said criterion to which corresponds said bar upon which said slider is visually situated.

4. The method for evaluating of claim 3, wherein in each said bar:
    all of said bands are visually differentiated from each other by at least one visual characteristic selected from the group consisting of color, shade and pattern;
    said slider is visually differentiated from every said band by at least one visual characteristic selected from the group consisting of color, shade and pattern.

5. The method for evaluating of claim 1, wherein said anomalousness exists if said at least one subject performance is encompassed by said at least one statistical non-normative range.

6. The method for evaluating of claim 1 wherein, if said at least one subject performance is encompassed by said at least one statistical non-normative range, said comparing includes ascertaining the degree of said anomalousness with respect to said at least one statistical normative range, said ascertaining the degree of said anomalousness including considering the situation of said at least one current performance relative to said at least one statistical normative range.

7. The method for evaluating of claim 1, wherein:
    at least one said statistical normative range is delimited by a maximum of a first standard deviational value with respect to a statistical mean;
    at least one said statistical non-normative range is delimited by a minimum of said first standard deviational value with respect to said statistical mean.

8. The method for evaluating of claim 1, wherein:
    at least one said statistical normative range is delimited by a maximum of one standard deviation from a statistical mean;
    at least one said statistical non-normative range is delimited by a minimum of one standard deviation from the statistical mean.

9. The method for evaluating of claim 8, wherein:
    at least one said statistical non-normative range is delimited by a minimum of one standard deviation from the statistical mean and by a maximum of two standard deviations from the statistical mean;
    at least one said statistical non-normative range is delimited by a minimum of two standard deviations from the statistical mean.

10. The method for evaluating of claim 9, wherein:
    if said subject performance is encompassed by a said statistical normative range that is delimited by a maximum of one standard deviation from the statistical mean, said comparing further includes designating said subject performance as being non-anomalous;
    if said subject performance is encompassed by a said statistical normative range that is delimited by a minimum of one standard deviation from the statistical mean and by a maximum of two standard deviations from the statistical mean, said comparing further includes designating said subject as being moderately anomalous;
    if said subject performance is encompassed by a said statistical normative range that is delimited by a minimum of two standard deviations from the statistical mean, said comparing further includes designating said subject as being severely anomalous.

11. The method for evaluating of claim 10, wherein the method further comprises recording at least one said instance of anomalous performance as being suitable for further investigation as a possible leading indicator.

12. The method for evaluating of claim 1, wherein:
    at least one said statistical normative range is delimited by a maximum of one standard deviational value with respect to a statistical mean;

at least one said statistical non-normative range is delimited by a minimum of one standard deviational value with respect to the statistical mean and by a maximum of two standard deviational values with respect to the statistical mean;

at least one said statistical non-normative range is delimited by a minimum of two standard deviational values with respect to the statistical mean.

13. The method for evaluating of claim 12, wherein:

if said subject performance is encompassed by a said statistical normative range that is delimited by a maximum of one standard deviational value with respect to a statistical mean, said comparing further includes designating said subject performance as being non-anomalous;

if said subject performance is encompassed by a said statistical normative range that is delimited by a minimum of one standard deviational value with respect to the statistical mean and by a maximum of two standard deviational values with respect to the statistical mean, said comparing further includes designating said subject as being moderately anomalous;

if said subject performance is encompassed by a said statistical normative range that is delimited by a minimum of two standard deviational values with respect to the statistical mean, said comparing further includes designating said subject as being severely anomalous.

14. A computer program product for residence in memory of a computer, said computer program product comprising a computer useable medium having computer program logic recorded thereon, said computer program logic being embodied in computer code for enabling said computer to evaluate relative performance of an activity, said evaluation of relative performance including:

formulating a baseline, said baseline representing a statistical distribution for plural historical performances of an activity; and comparing at least one subject performance of said activity to said baseline, said comparing including determining the existence of anomalousness of said at least one subject performance with respect to said plural historical performances;

wherein said baseline includes at least one statistical normative range and at least one statistical non-normative range, and wherein said comparing includes graphically displaying said baseline and said at least one subject performance, said graphically displayed baseline visually differentiating between each said statistical normative range and each said statistical non-normative range, each said graphically displayed subject performance visually indicating situation upon said baseline in either of a said statistical normative range and a said statistical non-normative range.

15. The computer program product of claim 14, said evaluation of relative performance including recording each instance of anomalousness for further investigation as a possible leading indicator.

16. The computer program product of claim 14, wherein said graphical displaying of said baseline and said at least one subject performance includes:

displaying at least one bar, each said bar corresponding to a criterion for performance of an activity, each said bar representing a said baseline that describes a statistical distribution for plural historical performances of an activity with respect to said criterion, each said bar including plural bands, at least one said band representing a said statistical normative range, at least one said band representing a said statistical non-normative range;

displaying at least one slider, each said slider being visually situated upon a said bar in one of a said statistical normative range and a said statistical non-normative range, each said slider representing a subject performance of said activity with respect to said criterion to which corresponds said bar upon which said slider is visually situated.

17. The computer program product of claim 16, wherein in each said bar:

all of said bands are visually differentiated from each other by at least one visual characteristic selected from the group consisting of color, shade and pattern;

said slider is visually differentiated from every said band by at least one visual characteristic selected from the group consisting of color, shade and pattern.

* * * * *